US010630699B2

(12) United States Patent
Galula et al.

(10) Patent No.: US 10,630,699 B2
(45) Date of Patent: Apr. 21, 2020

(54) AUTOMOTIVE CYBERSECURITY (71) Applicant: Argus Cyber Security Ltd., Tel Aviv (IL)

(72) Inventors: Yaron Galula, Kadima (IL); Ofer Ben Noon, Rishon LeZion (IL); Oron Lavi, Kfar Saba (IL)

(73) Assignee: Argus Cyber Security Ltd., Tel Aviv (IL)

( * ) Notice: Subject to any disclaimer, the term of this patent is extended or adjusted under 35 U.S.C. 154(b) by 428 days.

(21) Appl. No.: 15/675,829

(22) Filed: Aug. 14, 2017

(65) Prior Publication Data
US 2019/0052653 A1 Feb. 14, 2019

(51) Int. Cl.
*H04L 29/06* (2006.01)
*B60R 16/02* (2006.01)
*H04L 29/08* (2006.01)
*G06F 21/55* (2013.01)
*H04L 12/40* (2006.01)

(52) U.S. Cl.
CPC .......... *H04L 63/1416* (2013.01); *B60R 16/02* (2013.01); *G06F 21/55* (2013.01); *H04L 12/40* (2013.01); *H04L 63/1425* (2013.01); *H04L 63/1441* (2013.01); *H04L 67/12* (2013.01); *H04L 63/1466* (2013.01); *H04L 2012/40215* (2013.01)

(58) Field of Classification Search
CPC ..... B60R 16/02; G06F 21/55; H04L 63/1416; H04L 63/1425; H04L 63/1441; H04L 67/12
See application file for complete search history.

(56) References Cited

U.S. PATENT DOCUMENTS

| 2015/0191135 A1* | 7/2015 | Ben Noon | ............ | B60R 16/023 |
| | | | | 726/22 |
| 2016/0277423 A1 | 9/2016 | Apostolescu et al. | | |
| 2017/0013005 A1 | 1/2017 | Galula et al. | | |

FOREIGN PATENT DOCUMENTS

EP 2892199 7/2015

OTHER PUBLICATIONS

Christoph Hammerschmidt "German car industry plans to close OBD interface" Apr. 6, 2017, 2 pages, retrieved on Apr. 29, 2017: http://www.eenewsautomotive.com/news/german-car-industry-plans-close-obd-interface.
PCT International Search Report and Written Opinion dated Oct. 31, 2018 for PCT Application No. PCT/IL2018/050897 filed Aug. 13, 2018.

* cited by examiner

*Primary Examiner* — Brian F Shaw
(74) *Attorney, Agent, or Firm* — A.C. Entis-IP Ltd.; Allan C. Entis; Kenichi N. Hartman (57) ABSTRACT

A module for providing security to an in-vehicle communication network having a bus and at least one node connected to the bus, the module including: a memory having software including a model of an expected behavior of data communications over the portion of the in-vehicle communication network; and a processor that processes, responsive to the software in the memory, a plurality of messages registered from a portion of the in-vehicle network to: determine, based on the model and a context comprising attributes of the plurality of messages, whether or not at least one of the messages complies with the model; and if the at least one message does not comply with the model, then perform at least one action on the message.

17 Claims, 6 Drawing Sheets

AUTOMOTIVE CYBERSECURITY

BACKGROUND

Over the last half century the automotive industry has, initially slowly, and subsequently with great rapidity, been evolving from mechanical control systems for controlling a vehicle's functions to electronic "drive by wire" control systems for controlling the functions. In mechanical vehicular control systems a driver of a vehicle controls components of a vehicle that control vehicle functions by operating mechanical systems that directly couple the driver to the components via mechanical linkages. In drive by wire vehicle control systems a driver may be coupled directly, and/or very often indirectly, to vehicle control components that control vehicle functions by electronic control systems and electronic wire and/or wireless communication channels, rather than direct mechanical linkages. The driver controls the control components by generating electronic signals that are input to the electronic control systems and the communication channels.

Typically, a vehicular electronic control system comprises a driver interface for receiving driver actions intended to control a vehicle function, which comprises a plurality of driver action transducers (DATs) that convert driver actions to electronic driver control signals. Examples of DATs include an electronic accelerator pedal, an electronic brake pedal, an electronic steering wheel, electronic turn-signal levers, and cruise control buttons. An electronic control unit (ECU) of the control system receives the driver control signals, and responsive to these signals, operates to produce electronic control signals ("ECU output signals") that provide information to other ECUs and/or control one or more actuators involved in performing a desired vehicle function. Generally, a vehicular electronic control system further comprises a plurality of sensors that generate signals ("sensor signals") relevant to the vehicle function, and the ECU may receive and process sensor signals for generating appropriate ECU output signals. Driver control signals, ECU output signals, and sensor signals may be generically referred to herein as "control signals" or "signals". The ECU of a given vehicle control system may also receive and process control signals relevant to performance of the vehicle function generated by, and/or by components in, other vehicle control systems. The sensors, actuators, and/or other control systems communicate with each other and the ECU of the given control system via a shared in-vehicle communication network, to cooperate in carrying out the function of the given control system.

By way of example, a vehicle throttle by wire control system that replaces a conventional cable between an accelerator pedal and an engine throttle may comprise an electronic accelerator pedal as a DAT, an ECU also referred to as an engine control module (ECM), and an electronic throttle valve as an actuator that controls airflow into the engine and thereby controls power that the engine produces. The electronic accelerator pedal generates driver control signals responsive to positions to which a driver depresses the pedal. The ECM receives driver control signals from the electronic accelerator pedal, and in addition receives signals that may be generated by various sensors, actuators, and electronic control systems in the vehicle that provide information relevant to the safe and efficient control of the engine via an in-vehicle communication network. The ECM processes the driver control signals and the various signals to generate ECM output signals that control the throttle valve. Other sensors, that may provide relevant signals to the ECM over the in-vehicle network include, but are not limited to, air-flow sensors, fuel injection sensors, engine speed sensors, vehicle speed sensors, brake force and other traction control sensors comprised in a brake by wire system, and cruise control sensors.

In-vehicle communication networks of modern vehicles are typically required to support communications for a relatively large and increasing number of electronic control systems of varying degrees of criticality to the safe and efficient operation of the vehicles. A modern vehicle may for example be home to as many as seventy or more control system ECUs that communicate with each other and sensors and actuators that monitor and control vehicle functions via the in-vehicle network. The ECUs may, by way of example, be used to control in addition to engine throttle described above, power steering, transmission, antilock braking (ABS), airbag deployment, cruise control, power windows, lights (headlights, brake lights, turn signals), doors, and mirror adjustment. In addition, an in-vehicle network typically supports on board diagnostic (OBD) systems and communication ports, various vehicle status warning systems, collision avoidance systems, audio and visual information and entertainment (infotainment) systems and processing of images acquired by on-board camera systems. The in-vehicle network in general also provides, by way of example, access to mobile communication networks, WiFi and Bluetooth communications, TPMS (tire pressure monitor system) V2X (vehicle to vehicle communication), keyless entry system, the Internet. and GPS (global positioning system).

Various communication protocols have been developed to configure, manage, and control communications of vehicle components that are connected to and communicate over an in-vehicle communication network. Popular in-vehicle network communication protocols currently available are CAN (control area network), FlexRay, MOST (Media Oriented Systems Transport), Ethernet, and LIN (local interconnect network). The protocols may define a communication bus and how the ECUs, sensors, and actuators, generically referred to as nodes, connected to the communication bus, access and use the bus to transmit control signals to each other.

A control signal may propagates over an in-vehicle network packaged in and part of a payload of an in-vehicle network message (which may be referred to herein as "message"). Typically, an in-vehicle network of a given vehicle model employs a predefined set of message categories. A given message's category may be identified in a message ID field in a header of the message. The message category defines a plurality of fields within the payload of the message and identification of control signals in the fields. A single message therefore typically comprises a plurality of control signals in its payload. Typically, message IDs for messages used an in-vehicle network of a given vehicle model are standardized and are expected to remain unchanged absent software updates for the in-vehicle network.

The growing multiplicity of electronic control systems, sensors, actuators. ECUs and communication interfaces and ports, that an in-vehicle communication network supports makes the in-vehicle communication network, and the vehicle components that communicate via the communication system, increasingly vulnerable to cyber-attacks that may dangerously compromise vehicle safety and performance. A cyber-attack may, for example, cause a driver action to fail to initiate its intended vehicle function, or conversely initiate an unwanted vehicle function. By way of example, a cyber-attack may cause brake pads or braking lights to become unresponsive to a driver's depression of a brake pedal. Alternatively, a cyber-attack may cause the car to randomly perform a braking function without instructions from the driver or a safety system to do so.

SUMMARY

An aspect of an embodiment of the disclosure relates to providing apparatus, hereinafter also referred to as a Conflict Resolution Watchman (CRW), for providing security to an in-vehicle communication network of a vehicle that operates to determine whether a message transmitted over the in-vehicle network conflicts with a context of the vehicle, and if so to determine whether the message should be blocked or otherwise prevented from affecting vehicle operation. A message determined to conflict with the vehicle context may be referred to as an invalid message, and if it is determined not to conflict may be referred to as a valid message. Blocking or otherwise preventing a message or part of a message from affecting vehicle operation may be referred to as disabling the message.

In an embodiment the CRW determines whether a given message conflicts with vehicle context based on at least one message attribute characterizing the registered message, and a vehicle context vector comprising one or more features characterizing vehicle context.

Attributes that characterize the registered message may, by way of example, comprise periodicity of the message, a change in the periodicity, values that the message contains, and/or changes in values that the message contains. By way of example, the values contained in the messages may include a message ID and values of control signals. In an embodiment the at least one message attribute may comprise one or more of: an identification of a source of the message, attributes of an operator of the vehicle, and attributes responsive to how the operator operates a vehicle DAT that generated the message. In an embodiment the at least one message attribute may comprise attributes based on values of signals generated by a gesture recognition system, such as an imaging or audio system that generates messages, or signals comprised in messages, responsive to the operator.

In an embodiment, the CRW selects a classifier responsive to at least one message attribute of the given message, and applies the selected classifier to the vehicle context vector to determine if the given message conflicts with the vehicle context. In an embodiment, the vehicle context vector comprises a selection of attributes characterizing a selection of one or more messages other than the given message. Optionally, the features comprised in the vehicle context vector to be applied to the classifier are selected responsive to the classifier.

In an embodiment, the CRW pre-processes the given message and determines whether or not the given message warrants evaluation with the classifier, responsive to at least one attribute characterizing the given message. The at least one message attribute for the pre-processing may or may not be the same as the at least one attribute based on which the classifier is selected.

In an embodiment, vehicle context vectors are updated in real time. The real-time updating may comprise maintaining a Global Feature Vector which at any given time comprises latest feature values comprised in messages transmitted over the in-vehicle network for optionally all or a subset of message types, with the vehicle context vectors being updated responsive to the Global Feature Vector.

Optionally, the CRW comprises a human machine interface (HMI) to alert an operator of the vehicle to the existence of a conflicting message. Optionally, the HMI comprises an emergency input device (EID) that the operator may operate to override the conflicting message. Upon overriding a conflicting message, the CRW may control the in-vehicle network to override all messages that conflict with messages generated by direct operator control of DATs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
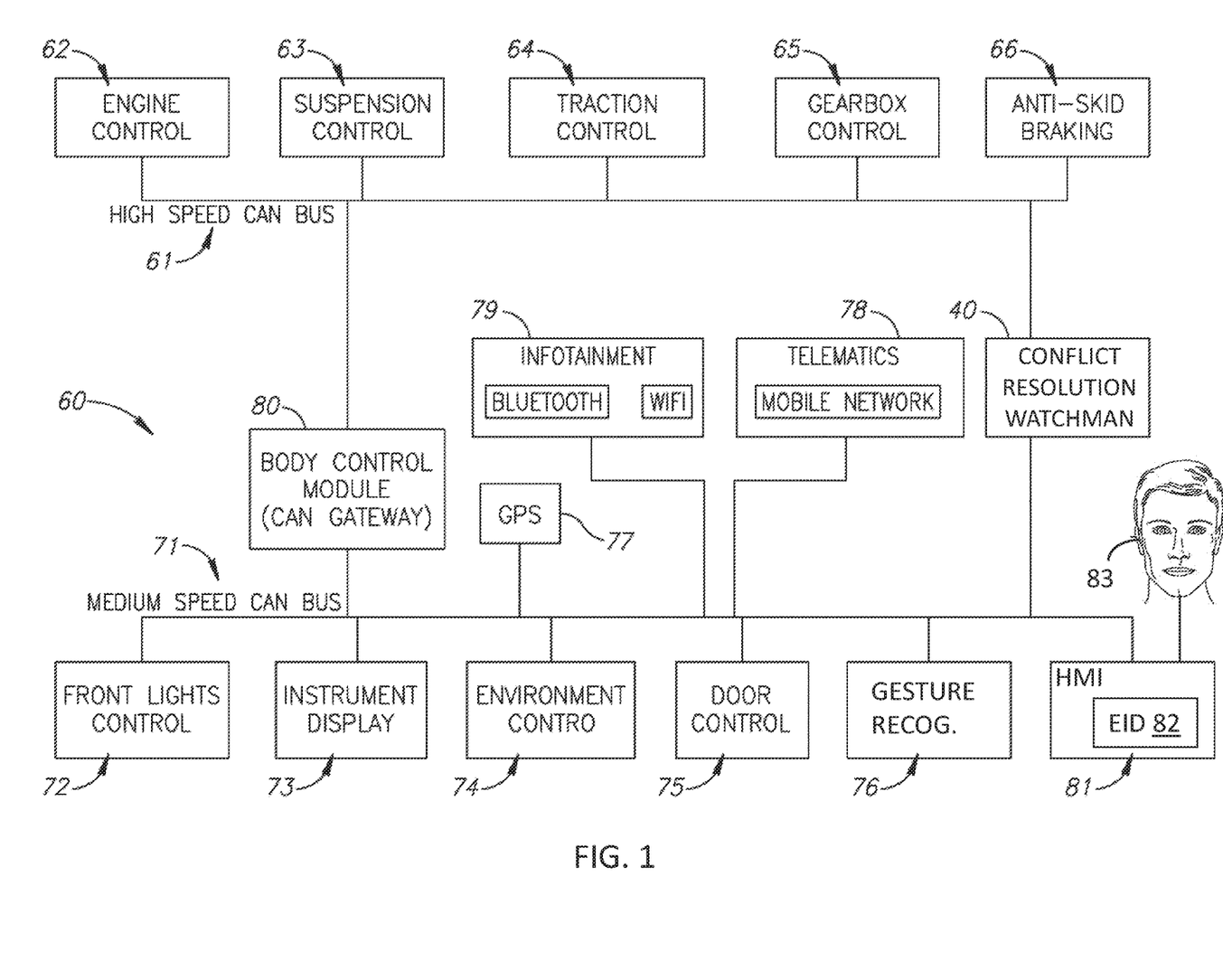
FIG. 1 shows a schematic block diagram of a portion of an in-vehicle communication system of a vehicle protected by a CRW, in accordance with an embodiment of the disclosure; [the figure doesn't have the title "FIG. 1]

FIG. 1 shows a schematic block diagram of a portion of in-vehicle communication network 60 showing a CRW 40 that protect the network and specific control systems as may be comprised in a subscriber vehicle (not shown). The control systems and/or their respective components are connected to one or both of high-speed and medium-speed CAN bus bars 61 and 71, respectively. Medium-speed CAN bus 71 may be a class B CAN bus that operates at data transmission speeds of up to 125 kilobits per second (Kbps), to support communications between nodes, such as components of vehicle body control systems and infotainment systems that can function properly, receiving and transmitting data at relatively low data transmission rates. By way of example, medium-speed CAN bus 71 is schematically shown connected to nodes that are front lights control, instrument display, environment control, door control 72, 73, 74, and 75 respectively. In an embodiment, medium-speed CAN bus 71 is connected to a node that is a gesture recognition system 76. An infotainment system 79 comprising Bluetooth and Wifi communication interfaces and a Telematics system 78 that provides a communication interface to mobile phone networks and supports hands free calling are connected to medium-speed CAN bus 71. A GPS receiver 77 is optionally separate from Telematics system 78, and is connected to medium-speed CAN bus 71. High-speed CAN bus 61 may be a class C CAN bus that operates at data transmission speeds of up to 1 megabits per second (Mbps) to support communications between nodes such as sensors and ECUs of various control systems that may require relatively high-speed transmission of data between the nodes to operate properly. High-speed CAN bus 61 is schematically shown connected to engine, suspension, traction, gearbox, and anti-skid braking control systems 62, 63, 64, 65, and 66 respectively. High-speed CAN bus 61 is connected by a body control module (CAN gateway) 80 to medium-speed CAN bus 71.

In an embodiment of the disclosure, in-vehicle communication network 60 is connected to a node 81 comprising an HMI that is operable to alert an operator 83 of the vehicle to the existence of a conflicting message, optionally as detected by CRW 40. Optionally, HMI 81 comprises an emergency input device (EID) 82 that the operator may operate to instruct the CRW to increase security vigilance. Upon receiving the instruction from EID 82, the CRW may control the in-vehicle network to override all messages that conflict with messages generated by direct operator control of DATs.

CRW 40 is optionally a two communication port module connected between high-speed CAN bus 61 and gateway 80 that connects the high-speed bus to medium-speed CAN bus 71.

Figure 3:
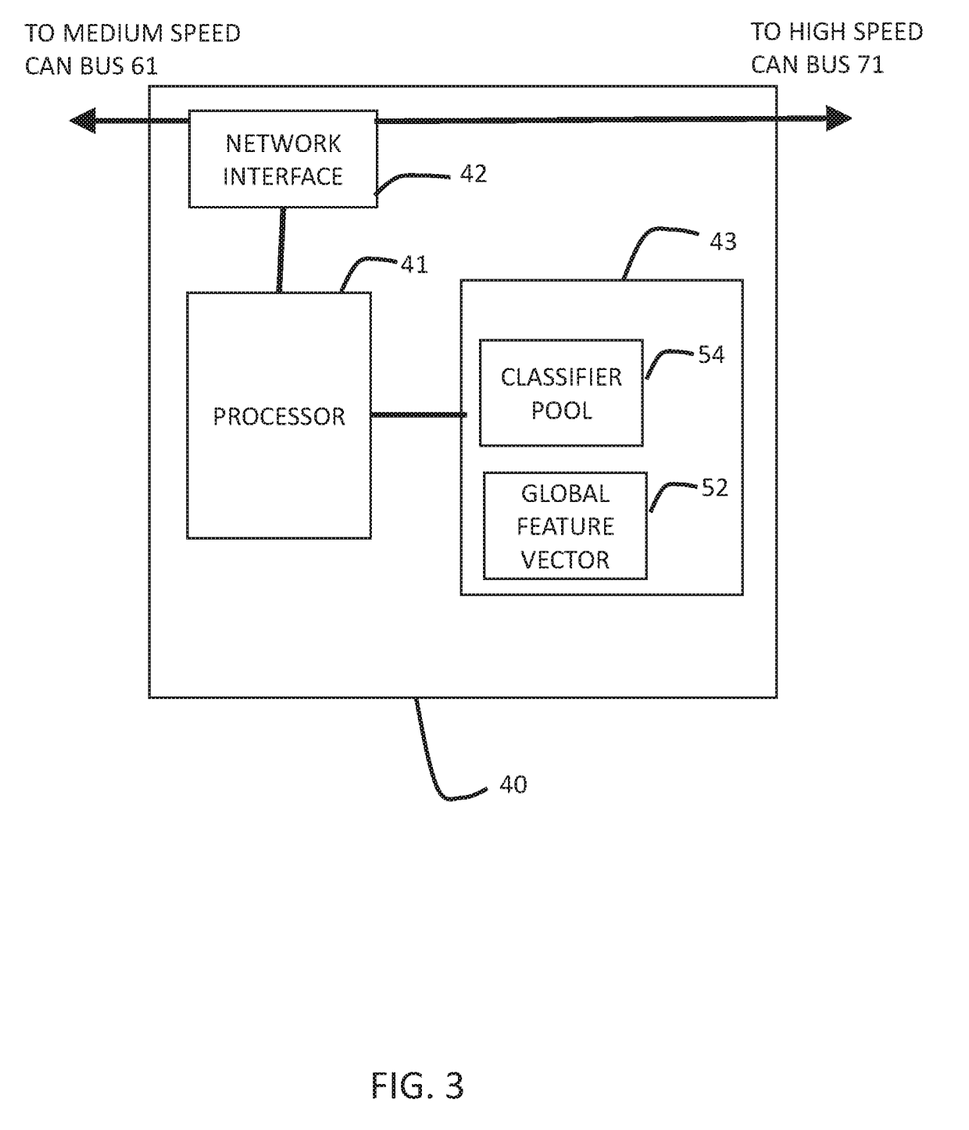
FIG. 3 schematically illustrates a block diagram of a CRW, in accordance with an embodiment of the disclosure.

In an embodiment of the disclosure, as schematically shown in FIGS. 1 and 3, CRW 40 is a separate hardware component comprising a processor and a memory. Alternatively or additionally, a CRW in accordance with an embodiment of the disclosure is a "virtualized Watchman" defined by a software component comprised in a node of in-vehicle communication network 60. For example, gateway 80 may comprise computer executable instructions and data, or a combination of software and hardware that provide Watchman functionalities in accordance with an embodiment of the disclosure that may be provided by CRW 40, shown separate from the gateway in FIG. 1. As another example, an ECM (not shown) in engine control system 62 may comprise computer executable instructions and data that provide Watchman functionalities in accordance with an embodiment of the disclosure that may be provided by CRW 40. A CRW may also be integrated to the hardware of a node, such as telematics system 78, of in-vehicle communication network 60.

CRW 40 in accordance with an embodiment of the disclosure is operable to monitor communications in in-vehicle communication network 60 to accumulate data from messages that it receives which may be used to characterize the messages. CAN messages may be characterized for example, by their 11 bit, or 29 bit extended, message ID, their respective frequency of transmission, an amount and type and contents of control signals they include in the payload, and a time stamp recording a time at which they are transmitted. A CAN message also typically comprises a 15 bit cyclic redundancy check (CRC) code at an end of the message.

It is further noted that CRW 40 in accordance with an embodiment of the disclosure may in addition to recording data relevant to CAN messages, may also keep a log of data relevant to its own performance and operation for analysis. For example, CRW performance data may be used to determine how frequently the CRW generated false positives or false negatives in identifying messages as malware.

In an embodiment, CRW 40 is operable to transmit data, or to instruct a component connected to in-vehicle communication network 60, for example infotainment system 79 or telematics system 78, to transmit data, hereinafter also referred to as "Watchman data", to a data monitoring and processing hub, hereinafter also referred to as a Cyber-Hub (not shown), the data being responsive to communications traffic over the in-vehicle communications network that the CRW monitors. The Cyber-Hub, which is located external to the vehicle comprising in-vehicle network 60, may process Watchman data from a subscriber vehicle to provide information fort the Watchman's monitoring of, and/or responding to detected anomalies in, communications over the vehicle's in-vehicle network. The Cyber-Hub, or a user, such as a subscriber authorized to receive information from the Cyber-Hub, may use the information to configure CRW 40.

The Cyber-Hub may be operable to communicate with a plurality of vehicles, each vehicle having an in-vehicle network, and optionally comprising a CRW 40. In an embodiment of the disclosure, the Cyber-Hub processes Watchman data from a plurality of subscriber vehicles to determine if a vehicle or a fleet of vehicles may be under threat of an imminent cyber attack, is under a cyber attack, or has vulnerability to a cyber attack. In response to detecting an imminent, on-going, or vulnerability to, cyber attack, the Cyber-Hub may configure one or more CRWs by transmitting information to the one or more CRWs over a suitable wire or wireless communication channel.

Figure 2:
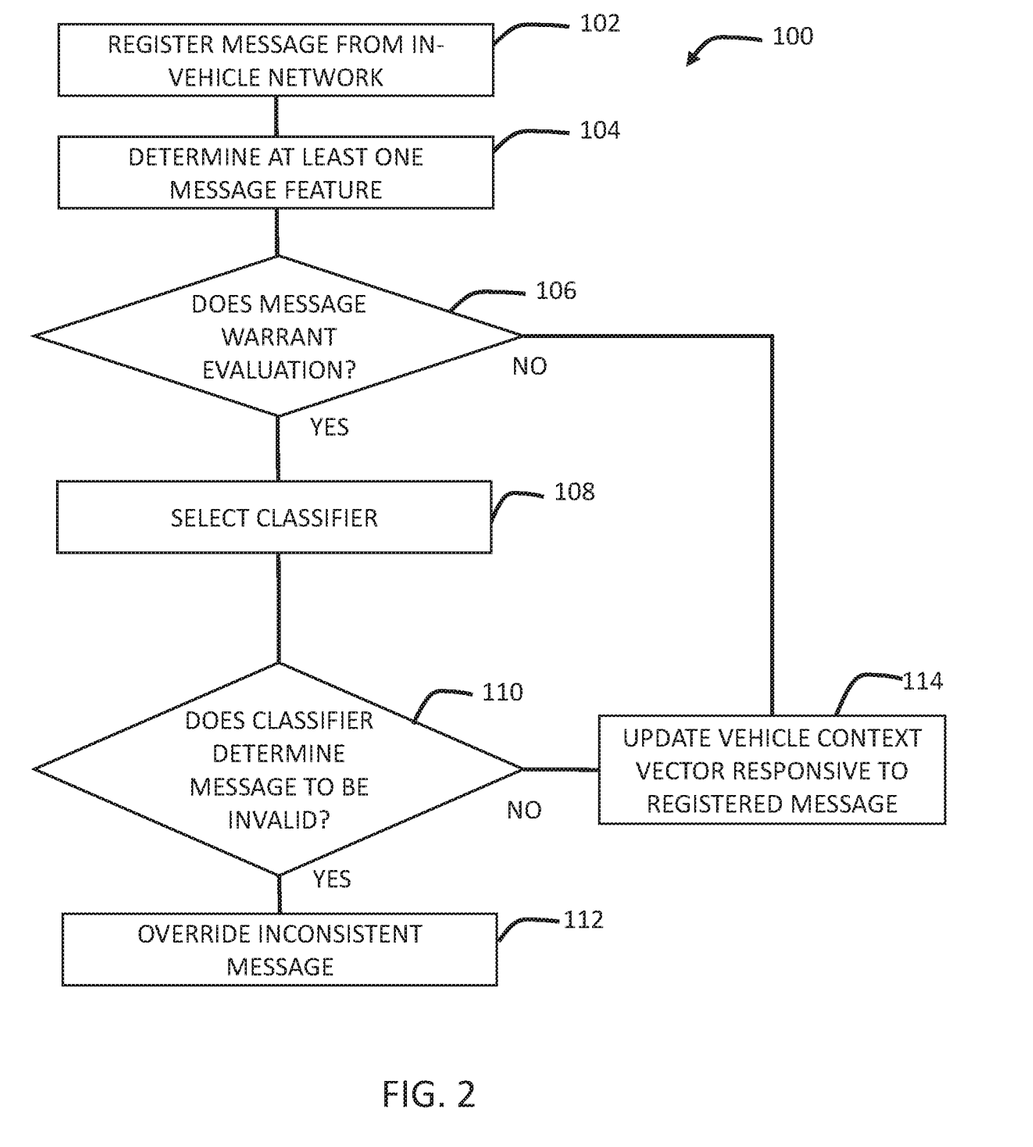
FIG. 2 shows a flowchart showing an operation of a Message Conflict Resolution process by CRW to determine whether a message is valid or invalid, in accordance with an embodiment of the disclosure.

FIG. 2 schematically shows components of a CRW 40 connected to in-vehicle communication network 60 that support operation of the CRW operating a Model-Based Message Monitoring Process, in accordance with an embodiment of the disclosure.

CRW 40 optionally comprises a processor 41 and a network interface 42 for transmitting messages to and receiving messages from a CAN bus or a CAN node to which the CRW is connected. By way of example, as shown in FIGS. 1 and 3, network interface 42 of CRW 40 is connected to high-speed CAN bus 61 and medium-speed CAN bus 71.

In an embodiment. CRW 40 comprises a memory 43, and CRW 40 is operable to optionally store in memory 43 any of a plurality of classifiers (which may be referred to herein as a "classifier pool 54") and/or a record of registered messages, including feature vectors comprising features based on or derived from the registered messages, such as (as is discussed further herein) message feature vectors, vehicle context vectors, and a Global Feature Vector. Any of the feature vectors described herein may or may not be stored in memory 43 as contiguous memory blocks.

In an embodiment, processor 41 processes a message it receives via network interface 42 in accordance with computer executable instructions, optionally stored in memory 43, for executing a Message Conflict Resolution process in accordance with an embodiment of the disclosure.

FIG. 2 shows a flow diagram 100 of an example scenario of a response by CRW 40, by way of example as shown in FIG. 3 to a CAN message propagated over in-vehicle communication network 60 that the CRW receives, during operation of a Message Conflict Resolution process in accordance with an embodiment of the disclosure.

In a block 102, CRW 40, optionally via network interface 42, registers a CAN message. Optionally, network interface 42 timestamps the registered message.

In a block 104, processor 41 determines at least one message attribute characterizing the registered message. Optionally, a message attribute comprises a value of a field comprised in the registered messages, and/or assigned to the registered message by CRW 40. Optionally, a message attribute comprises a timestamp (t) for the registered message. The timestamp is optionally generated by CRW 40 upon registration of the message by the CRW or by a node that transmitted the message at a time of transmission. Optionally, a message attribute comprises a message ID of the message. Optionally, a message attribute comprises a source or destination of the message. Optionally, a message attribute comprises a signal value (V) comprised in the payload of the registered message.

Optionally, a message attribute is based on a change of a message attribute between a presently registered message and another message ("a most-recent matching message") having a same message ID that was most recently registered in CRW 40 previous to the presently registered message. As such, a message attribute may comprise a time-interval ($\Delta t$) between the registered message and the most-recent matching message. Alternatively or additionally, a message attribute may comprise a change ($\Delta\Delta t$) in the time-interval between the registered message and the most-recent matching message. Alternatively or additionally, a message attribute may comprise a change ($\Delta v$) in a signal value between the registered message and the most-recent matching message. Other examples of message attributes include: attributes characterizing an operator of the vehicle, attributes based on signals generated from operation of a vehicle DAT by the operator, and attributes based on control signals generated by a gesture recognition system, such as an imaging or audio system. Optionally, the imaging system is an optical imaging system or a radio frequency imaging system configured to monitor location and movement of the operator. Optionally, the attributes characterizing an operator of the vehicle comprise control signals characterizing a location or movement of the operator or a portion of the operator. The portion of the operator may be, by way of example, an arm, a leg, a hand, a foot, a head, a hip or a shoulder. Optionally, the attributes characterizing a location or movement of the operator or a portion thereof characterize, and optionally are comprised as control signals in, messages generated by the gesture recognition system or the vehicle DAT.

In a block 106, processor 41 determines whether or not the registered message warrants evaluation with a classifier. Optionally, the determination is based on the at least one message attribute of the registered message. Optionally, every message characterized with certain message IDs, but not others, is determined to warrant classifier evaluation. Optionally, a message characterized with a change in at least one message attribute, by way of example a change ($\Delta\Delta t$) in time-interval and/or a change in a signal value ($\Delta V$), beyond a predefined threshold compared to a most-recent matching message, is determined to warrant evaluation with a classifier. The predefined threshold may be different for each message attribute. In an embodiment, the threshold may be made more or less stringent responsive to instructions provided by an operator of the vehicle.

By way of example, certain message IDs may be designated as cyclic messages, such that messages with a given message ID is transmitted by a node connected to an in-vehicle network characterized by having a constant, unchanging time interval. Other message IDs may be designated as Cyclic-and-On-Change (CAOC) message, in which messages having a given ID are configured to be transmitted at a constant time interval, as well as at additional times when a changes in a signal value is written onto the message payload. Thus, cyclic and CAOC messages may have a $\Delta\Delta t$ value of 0 (or within a predefined threshold from 0) in most instances, indicating constancy of the time-interval and thus normal function of the message type. By contrast, a non-zero value $\Delta\Delta t$ (above or below 0 beyond a predefined threshold) may indicate some kind of event, and thus an increased risk of the message being an invalid message generated as a result of a cyberattack, and thus warrant classifier evaluation.

Optionally, process 100 bypasses block 106 and proceeds from determining the at least one message attribute characterizing the registered message (block 104), to selecting a classifier (block 108).

In a block 108, processor 41, selects at least one classifier for evaluating a registered message determined to warrant evaluation. The classifier is optionally one of the following classifier types: a decision tree, a Support Vector Machine (SVM), a Random Forest classifier and a Nearest Neighbor classifier. Optionally, the classification model is a decision tree. Optionally, the decision tree is a classification and regression tree (CART).

In an embodiment, the at least one classifier is selected from a classifier pool 54 accessible to processor 41, optionally stored in memory 43. Each classifier comprised in the classifier pool may be designated for evaluating a predetermined subset of CAN messages characterized by one or more message attributes. As such, in an embodiment, a classifier for evaluating a registered message is selected responsive to at least one message attribute of the registered message. By way of example, the at least one classifier may be designated to evaluate a message characterized by one or a combination of two or more of: a given message ID, a given signal value, and a change in a signal value ($\Delta V$) of a given signal. Optionally, a registered message determined to warrant evaluation is evaluated by a plurality of classifiers. It is possible that in the classifier selection process of block 108, classifier pool 54 contains no classifier was designated to evaluate the registered message. In such a case, the registered message is optionally determined to be valid, or alternatively, the message is determined to have a higher risk of being generated responsive to a cyber attack, and thus determined to be invalid.

The determination of a registered message as warranting evaluation, and the selection of a classifier to evaluate the message determined to warrant evaluation, are optionally based on a same set, a partially overlapping set, or different non-overlapping sets of message attributes characterizing the registered message. A set of attributes may comprise a single message attribute. By way of example, a registered message may be determined to warrant classifier evaluation based on the message's message ID and a change in signal value ($\Delta V$) of a given signal encoded in a payload of the message, and the classifier for evaluating the message may be selected based only on the message ID.

A determination of a registered messages as warranting classifier evaluation (block 106) and/or a selecting of a classifier for evaluating the message (block 108) is optionally executed responsive to a set of classifier matching rules stored in a memory comprised in or accessible to CRW 40, for execution by processor 41.

The classifier pool 54, and/or the classifier matching rule set, may be editable, optionally through a wired or wireless connection via other nodes connected to the in-vehicle network, by way of example through infotainment system 79 or telematics system 78 connected to in-vehicle network 60 as shown in FIG. 1. By way of example, CRW 40 may receive a new or edited classifier pool, or a new or edited classifier matching rule set, from a Cyber-Hub or a user of the Cyber-Hub.

A classifier comprised in classifier pool 54 is, optionally, generated through a machine learning process that trains a classifier using a history of previously recorded messages, optionally their message attributes. Optionally, the history is recorded from the in-vehicle network of the vehicle into which the CRW is installed. Alternatively or additionally, the history includes messages recorded from the in-vehicle network of one or more other vehicles comprising an in-vehicle network configured to employ a same plurality of message types characterized by message IDs as the plurality of messages types employed in the in-vehicle network to which the CRW is installed.

A machine learning process optionally comprises: accessing a message record comprising message entries for a plurality of messages registered from at least one in-vehicle network presumed to have not experienced a cyber-attack; selecting a plurality of messages in the message record characterized by at least one common message attribute; for each selected message, creating a test vehicle context comprising a plurality of message attributes characterizing messages prior to the selected messages; and training a classifier with the plurality of test vehicle contexts.

In an embodiment, in a block 110, processor 41 evaluates the registered message with the selected classifier(s). In an embodiment, the classifier is a binary classifier configured to classify a registered message as being (1) valid or (2) invalid, in light of a feature vector (a "vehicle context vector") comprising one or more message attributes characterizing messages registered by the CRW other than the message being evaluated. Optionally, the other registered messages comprise, or consist of, messages registered by the CRW prior to the registered message being evaluated by the classifier. In an embodiment, each classifier is separately characterized by, and defines, a set of message attributes comprised in the vehicle context vector to be used as input for the classifier to conduct the evaluation.

By way of example, where each classifier in a classifier pool is designated to evaluate a message characterized with a given message ID, a given classifier H may be represented as $H(ID_i, S_i)$, in which the classifier H is designated for evaluating whether or not a message having message $ID_i$ was expected, given vehicle context vector $S_i$. As such, the classifier $H(ID_i, S_i)$, that was selected responsive to the registered message having message $ID_i$ may be configured to produce one of two outputs, responsive to vehicle context vector $S_i$: (1) registered message is valid; and (2) the registered message is invalid. Optionally, the classifier pool comprises at least one classifier designated for each one, or a subset, of the message IDs used in the in-vehicle network.

By way of another example, each classifier of a classifier pool may be designated to evaluate whether or not a change $\Delta V_j$ in a value $V_j$ of a given signal encoded in a registered message having a given message ID was expected, in light of a vehicle context vector. In such an example, a given classifier H may be represented as $H(ID_i[\Delta V_j], S_{ij})$, in which the classifier H is designated for evaluating a registered message having message $ID_i$, and evaluates whether or not the registered message was expected to show a change in signal value $V_j$, given vehicle context vector $S_{ij}$. The output of the classifier. (1) change or (2) no change for signal value $V_j$, is compared with the actual state of $V_j$ for the registered message. If the output of the classifier is consistent with the actual state of $V_j$ for the registered message, that is where the output of the classifier is "a change in signal value $V_j$" and signal value $V_j$ of the registered message changed beyond a predetermined threshold, or the output of the classifier is "no change in signal value $V_j$" and signal value $V_j$ of the registered message did not change (stayed within a predetermined threshold), then the registered message is determined to be valid. Otherwise, and the output of the classifier is not consistent with the actual state of $V_j$ for the registered message, the message is determined to invalid.

Optionally, at least one vehicle context vector comprises one or more message attributes characterizing a location and/or movement of an operator of the vehicle or a portion of the operator, such that validity of a registered message is determined responsive to the at least one message attribute characterizing a location and/or movement of an operator of the vehicle or of at least one portion of the operator such as an arm, a leg, a hand, a foot, a head, a hip or a shoulder. Optionally, the one or more message attributes characterizing location and/or movement characterize a message generated by a DAT or gesture recognition system 76, which may comprise an imaging system configured to monitor the operator during operation of the vehicle.

In an embodiment, in a block 112, where processor 41 determines the registered message to be invalid, the registered message is disabled. Optionally, the disabled message or a portion thereof is blocked or otherwise prevented from affecting operation of the vehicle and/or the in-vehicle network.

In an embodiment, vehicle context vectors are dynamically updated in real time. In an embodiment in a block 114, where processor 41 determines the registered message to be valid, one or more vehicle context vectors are updated to incorporate message attributes of the registered message.

In an embodiment, the one or more vehicle context vectors are updated in real time through a Global Feature Vector, schematically represented as a box 52 as shown in FIG. 3, which at any given time comprises latest values of message attributes characterizing messages transmitted over the in-vehicle network for optionally all, or a subset of, message types. In an embodiment, Global Feature Vector 52 comprises, at any given time, latest values of every message attribute comprised in the one or more vehicle context vectors, and Global Feature Vector 52 is updated to incorporate message attribute values of the registered message.

Further optional details and embodiments regarding maintenance of Global Feature Vector 52 provided hereinbelow with reference FIGS. 4 and 5.

Optionally. Global Feature Vector 52 is stored in memory 43. A vehicle context vector is optionally comprised of a selection of message attributes comprised in Global Feature Vector 52, and if a value of a message attribute in the Global Feature Vector changes, the change is also reflected in a vehicle context vector comprising the same feature. In an embodiment, Global Feature Vector 52 comprises, at any given time, latest values of message attribute comprised in the one or more vehicle context vectors. Further optional details and embodiments regarding Global Feature Vector 52 and its relation to a vehicle context vector are provided hereinbelow with reference FIGS. 6A and 6B.

In an embodiment, the one or more vehicle context vectors are stored in memory 43 as separate vectors from each other, as well as from Global Feature Vector 52, and whose values are updated from the Global Feature Vector. As such, optionally, when processor 41 evaluates a message, processor 41 provides the selected classifier with feature values stored in the appropriate vehicle context vector associated with the selected classifier. In another embodiment, the one or more vehicle context vectors may be stored as a constellation of features comprised within Global Feature Vector 52. As such, optionally, when processor 41 evaluates a message, processor 41 selects a set of features comprised in Global Feature Vector 52 as input to provide to the classifier selected for evaluating the message, the appropriate set of features characterizing the context feature vector associated with the selected classifier.

Optionally, the CRW comprises or is operatively connected to a HMI 81 (FIG. 1) operable to alert an operator 83 of the vehicle to a message conflict when the CRW determines a message to be invalid. Optionally. HMI 81 is operable to alert operator 83 when more than a predefined number of messages are determined to be invalid in a predefined time frame. Optionally, operator's operation of to EID 82 comprised in the HMI instructs the CRW to increase security vigilance. By way of example, upon receiving the operator's instruction, the CRW may proceed to disable the invalid message. Alternatively or additionally, upon receiving the operator's override instruction, the CRW may control the in-vehicle network to prioritize message generated by direct operator control of a DAT or a gesture recognition system, and override other messages. Optionally, the default state of the CRW is not to be active in evaluating messages, and operator's activation of the EID causes activation of the CRW. Alternatively or additionally, upon receiving the operator's EID instruction to increase security vigilance, the CRW may continue to override subsequent conflicting messages without further activation of the EID by the operator.

Optionally, the operator's activation of EID 82 may cause a threshold to change so that messages that previously would have been considered valid become invalid. Optionally, EID activation causes a threshold to change so that messages that previously would not have been determined in decision block 106 (as shown in FIG. 2) to warrant evaluation with a classifier will come to be considered to warrant evaluation. Optionally, EID activation lowers a predetermined threshold for a change in at least one message attribute, by way of example a change ($\Delta\Delta t$) in time-interval and/or a change in a signal value ($\Delta V$), compared to a most-recent matching message, to be determined as warranting evaluation with a classifier.

Figure 4:
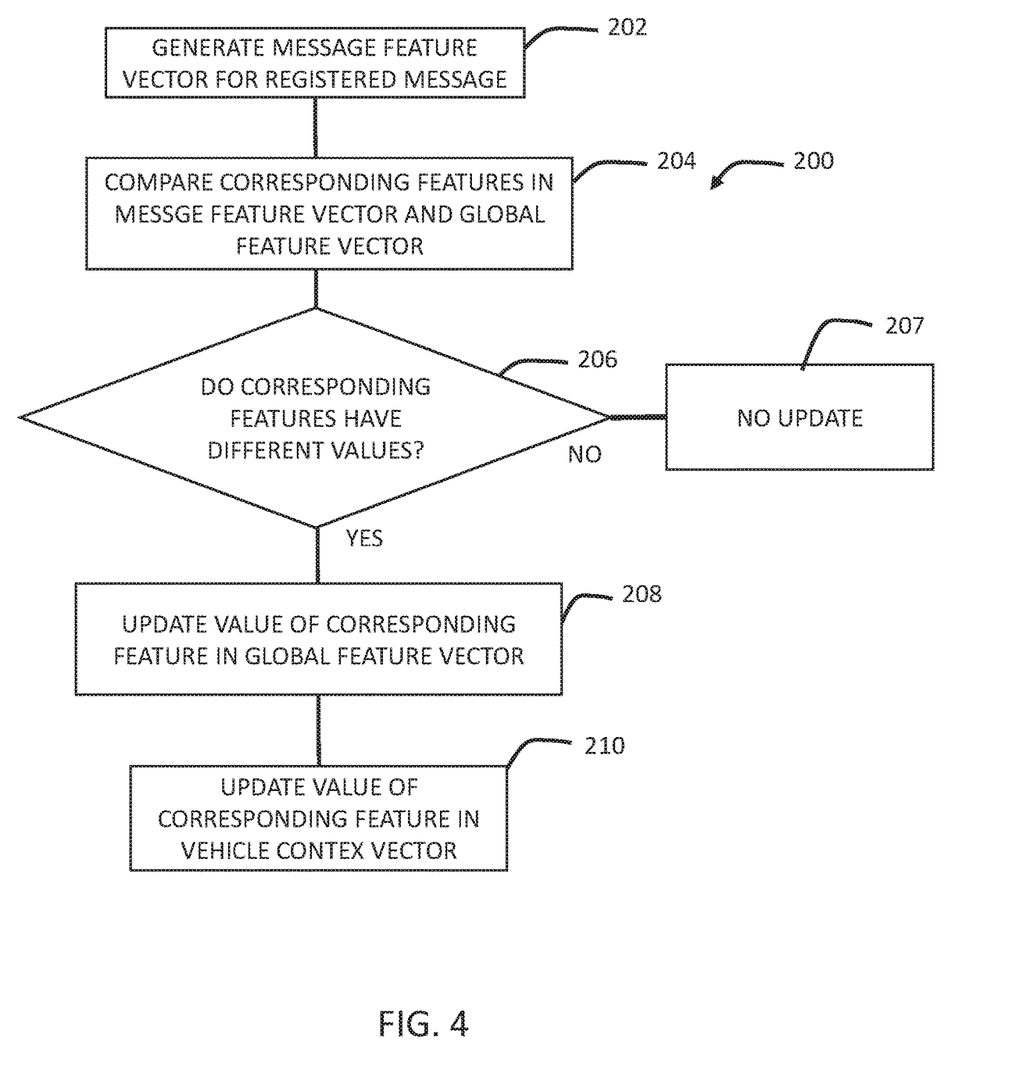
FIG. 4 shows a flowchart showing an operation of a CRW to update a Global Feature Vector, in accordance with an embodiment of the disclosure.
Figure 5:
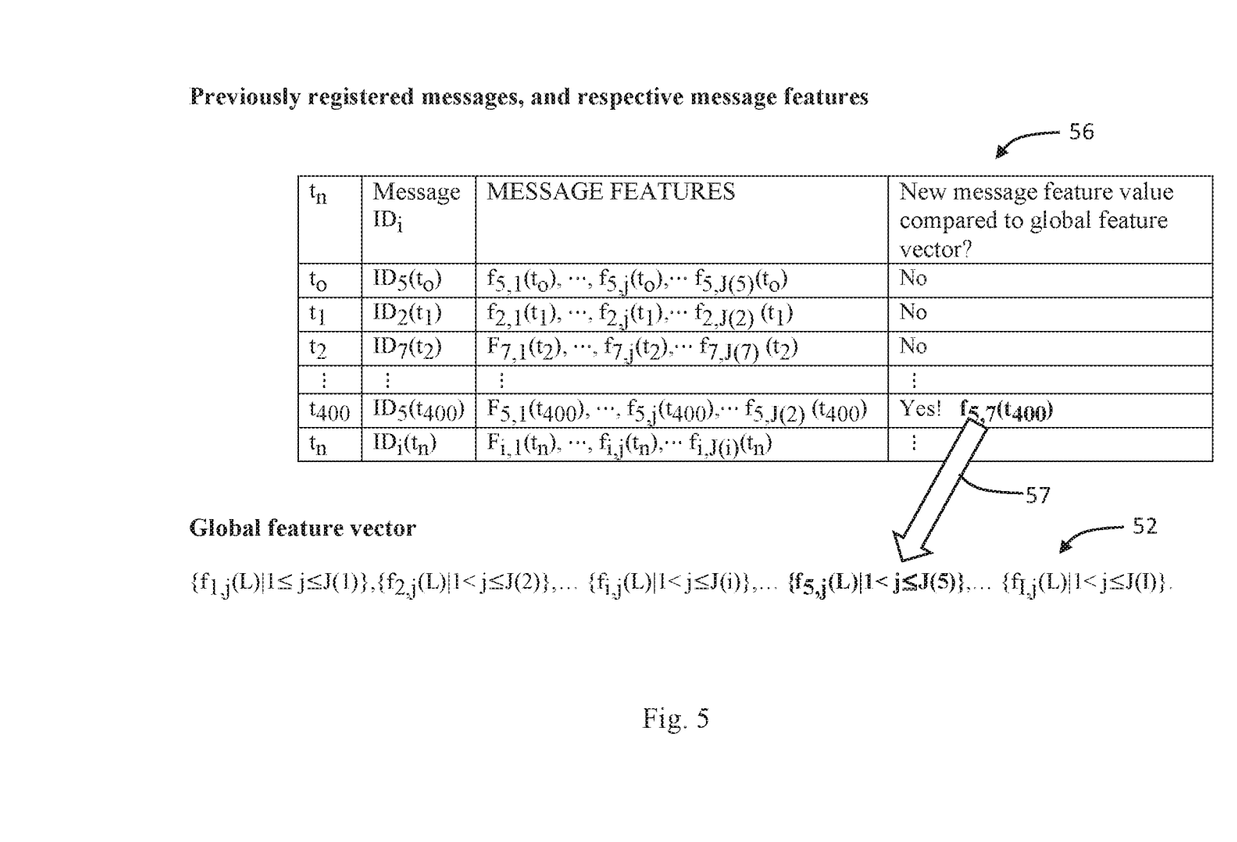
FIG. 5 schematically illustrates a real-time updating of a Global Feature Vector responsive to a registered message, in accordance with an embodiment of the disclosure.

Reference is now made to FIGS. 4 and 5. FIG. 4 shows a flowchart illustrating a process 200, optionally performed by processor 41, for maintaining a Global Feature Vector in real time, in accordance with an embodiment of the disclosure. FIG. 5 schematically illustrates representations of message feature vectors generated responsive to registered messages and a representation of a Global Feature Vector, in accordance with an embodiment of the disclosure. Optionally, process 200 is comprised in block 114 of process 100.

In a block 202, in an embodiment, processor 41 generates a message feature vector comprising at least one message attribute of the registered message. Message attributes comprised in the message feature vector is optionally selected from any of the message attributes disclosed herein with reference to block 106 of process 100—determining whether or not the registered message warrants evaluation with a classifier. There may or may not be identity or overlap with the at least one message attribute used in determining whether or not a registered message warrants evaluation, and the at least one message attribute comprised in the message feature vector.

A message feature vector characterizing a message having a given message ID of $ID_i$, where $1 \leq i \leq I$ and I represents a count of all, or a subset, of the different message IDs used in the in-vehicle network. A message feature vector for a given message $ID_i$ may have a predetermined number of $J(i)$ features with each feature represented as $f_{i,j}$, where $1 \leq j \leq J(i)$, such that the message feature vector for a message having message ID of $ID_i$ may be represented as a set of features $f_{i,1}$, $f_{i,2}$, $f_{i,j}$ ... $f_{i,J(i)}$. As such, a message feature vector characterizing a message having a message ID of $ID_i$ timestamped at a time $t_n$, comprising $J(i)$ features may be represented as: $\{f_{i,j}(t_n)|1 \leq j \leq J(i)\}$. Each message ID may have different features that are included in its respective message feature vector. An in-vehicle network may employ, for example, 20, 50, or 1000 message types, and each message may comprise a dozen or more fields encoding message attributes such as message ID, message source and destination, and various signal values. Moreover, some message attributes are not directly encoded in message fields, for example a timestamp for registration, and other message attributes like a change in signal value ($\Delta V$) are calculated from message field values. As such, Global Feature Vector 52 may comprise thousands of features.

In an embodiment, the message attributes included in the message vectors are determined by the classifiers available for use in evaluating messages (by way of example comprised in classifier pool 54 shown in FIG. 3). Optionally, only message attributes that are used by at least one of the available classifiers, as inputs in their respective vehicle context vectors, are included in a message feature vector. By way of example, if at least one classifier in the classifier pool uses a change in time interval ($\Delta\Delta t$) of message $ID_5$ as an input, then $\Delta\Delta t$ is included as a feature in the message feature vector generated from a registered message having message $ID_5$. However, if none of the classifiers in the classifier pool uses a $\Delta\Delta t$ of message $ID_{34}$ as an input, then $\Delta\Delta t$ is not included as a feature in the message feature vector generated from a registered message having message $ID_{34}$.

By way of example, a message feature vector characterizing a message having message $ID_5$, timestamped at $t=t_1$ may be a feature vector comprising nine ($J(5)=9$) message features: message $ID_5$ as $f_{5,1}(t_2)$: a message source as $f_{5,2}(t_2)$; timestamp $t_2$ as $f_{5,3}(t_2)$: a time-interval ($\Delta t$) between the timestamp of the registered message and the timestamp of the most-recent matching message as $f_{5,4}(t_2)$; a change ($\Delta\Delta t$) in the time-interval ($\Delta t$) compared to that of the most-recent matching message as $f_{5,5}(t_2)$; a first signal value $V_1$ as $f_{5,6}(t_2)$; a change ($\Delta V_1$) in the first signal value compared to that of the most-recent matching message as $f_{5,7}(t_2)$; a second signal value $V_2$ as $f_{5,8}(t_2)$; a change ($\Delta V_2$) in the second signal value compared to that of the most-recent matching message as $f_{5,9}(t_2)$.

Optionally, a message feature vector for a registered message is generated after the registered message either determined to not warrant evaluation (block 106, FIG. 2), or determined to be valid following evaluation with a classifier (block 110, FIG. 2). Alternatively, a message feature vector for the registered message is generated first, and the determination of at least one message attribute (block 104. FIG. 2) comprises a selection of message attributes from the message attribute vector.

FIG. 5 shows a data table 56 listing a set of messages previously registered by CRW 40 at times $t_0$ through $t_{400}$. At time to, CRW 40 registers a message having a message ID of $ID_5$, and generates a message feature vector comprising $J(5)$ message attributes characterizing the registered message, the message feature vector being represented in data table 56 as $f_{5,1}(t_0), \ldots, f_{5,j}(t_0), \ldots f_{5,J(5)}(t_0)$. As shown in data table 54, further messages are registered over time.

FIG. 5 also shows a representation of Global Feature Vector 52. Optionally, Global Feature Vector 52 comprises a concatenation of message vectors for each one, or a predetermined subset, of all message IDs used in the in-vehicle network, with a difference being that, instead of each message attribute having a value characterizing a particular message registered at a particular time (as in the message feature vectors shown for example in data table 56), each feature in the Global Feature Vector has a latest value (represented as time=L) of the corresponding message attribute. A j-th feature characterizing a message having a message ID of $ID_i$, having the latest value of the message attribute based on messages previously registered by CRW 40, may be represented as $f_{i,j}(L)$. A Global Feature Vector storing the latest message attribute values for each message attribute characterizing messages of each of message IDs may be thus be represented as:

$$\{f_{i,j}(L)|1 \leq I, 1 \leq j \leq J(i)\}$$

in which I represents the count of all, or a subset, of the different message IDs used in the in-vehicle network, and J(i) represents the number of message attributes characterizing a message having a given message ID of $ID_i$. The Global Feature Vector, when represented in a more expanded form, may be represented as shown for Global Feature Vector 52 in FIG. 5:

$$\{f_{1,j}(L)|1 \leq j \leq J(1)\}, \{f_{2,j}(L)|1 \leq J(2)\} \ldots \{f_{i,j}(L)|1 \leq j \leq J(i)\} \ldots \{f_{5,j}(L)|1 \leq S \leq J(5)\} \ldots \{f_{I,j}(L)|1 \leq j \leq J(I)\}.$$

In a block 204 (FIG. 4), processor 41 optionally compares message attributes comprised in a message feature vector with corresponding features in Global Feature Vector 52. Optionally, in a decision block 206, if the respective values in the corresponding features are the same, then no change is made to Global Feature Vector 52 (block 207), and the message feature vector is optionally deleted or stored, by way of example in memory 43. Also in decision block 206, if the respective values in the corresponding features are different, then, in a block 208, the value of the compared feature in the Global Feature Vector is updated to the value of the corresponding feature in the message feature vector. Following the updating of the Global Feature Vector, in a block 210, one or more corresponding features in one or more vehicle context vector may be updated responsive to the updating of the Global Feature Vector. In addition, after the updating of the Global Feature Vector and/or the vehicle context vector, the message vector is optionally deleted or stored in memory 43.

By way of example, as shown in data table 56 (FIG. 5), a message having a message ID of $ID_2$, registered by CRW 40 at time=$t_{400}$, is found to have a message attribute $f_{5,7}(t_{400})$ whose value is different from that of the corresponding feature $f_{5,7}(L)$ in Global Feature Vector 52. Upon determining the difference in value, processor 41 updates the value of feature $f_{5,7}(L)$ in Global Feature Vector 52 to the value of $f_{5,7}(t_{400})$. The updating of the value of feature $f_{5,7}(L)$ with the value of $f_{5,7}(t_{400})$ is schematically represented in FIG. 5 as a block arrow 57 connecting "$f_{5,7}(t_{400})$" (in bold) shown in data table 56 with "$\{f_{5,j}(L)|1 \leq j \leq J(5)\}$" (in bold).

In an alternative embodiment of process 200, blocks 204 and 206 are bypassed and no comparison of message attribute values are made, such that after a message feature vector is generated (block 202), a Global Feature Vector is updated (block 208) to reflect the value of each of the corresponding message attributes comprised in the message feature vector. The updating is done whether or not the corresponding message attribute values are the same or different. While more features undergo updating in such a process, bypassing the comparison of attribute values advantageously makes the process less computationally intensive. In yet another alternative embodiment of process 200, blocks 202, 204 and 206 are bypassed, and a Global Feature Vector is updated (block 208) to reflect the value of corresponding message attributes derived from the registered message, without creation of a separate message feature vector.

In an embodiment. Global Feature Vector 52 includes message attributes such as a timestamp and signal values, so that message attributes such as $\Delta t$, $\Delta\Delta t$, to $\Delta V$ that require calculation of a change of a message attribute between a subsequently registered message and its most-recent matching message can be calculated from values stored in Global Feature Vector 52, thus obviating a need to store the message feature vectors generated for each registered message. Note that, in an embodiment, Global Feature Vector 52 can be used to calculate the at least one message attribute for determining whether or not a registered message warrants evaluation with a classifier (block 106 of process 100, as shown in FIG. 2) or for selecting a classifier (block 108 of process 100, as shown in FIG. 2).

Figure 6A:
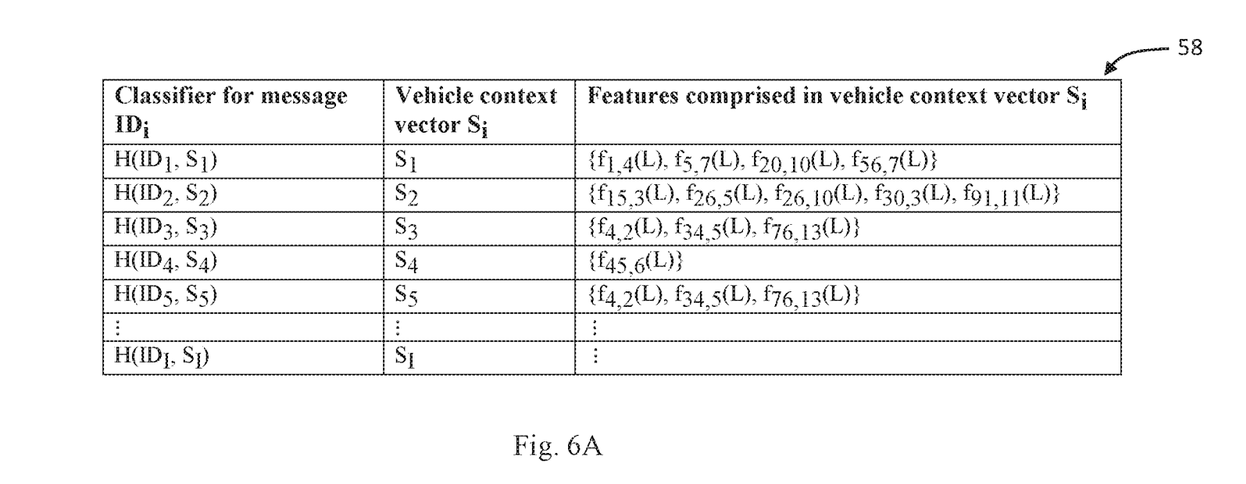
FIGS. 6A and 6B schematically illustrate a real-time updating of a vehicle context vector responsive to a Global Feature Vector, in accordance with an embodiment of the disclosure.
Figure 6B:
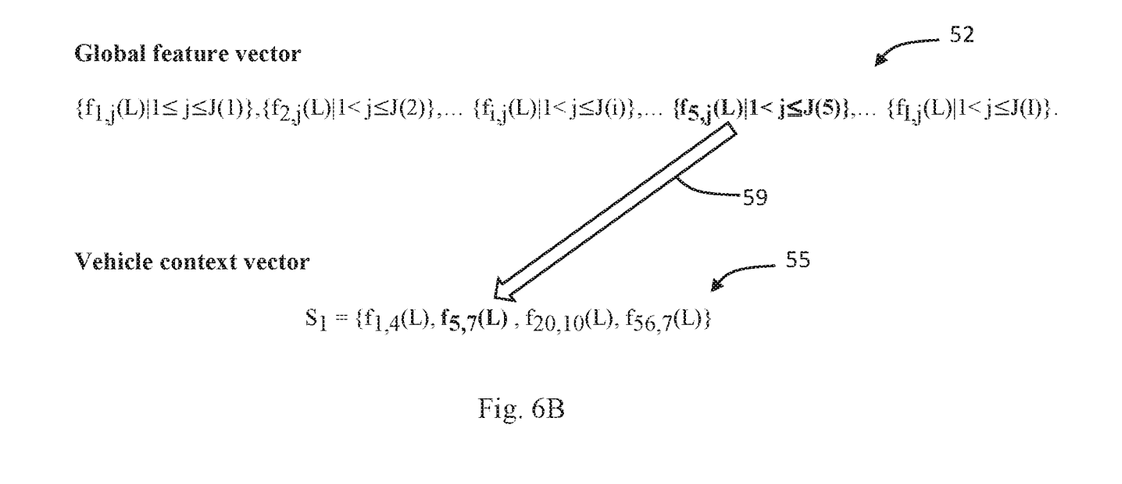

Reference is now made to FIGS. 6A-6B, which schematically illustrate real time updating of a vehicle context vector responsive to a Global Feature Vector, in accordance with an embodiment of the disclosure.

FIG. 6A shows a data table 58 listing a plurality of exemplary classifiers $H(ID_i, S_i)$, where $1 \leq i \leq I$ comprised in a classifier pool for evaluating registered messages characterized with one of message IDs $ID_1$ through $ID_I$. As noted hereinabove with reference to block 110 of process 100 (FIG. 2), each classifier comprised in the classifier pool is separately characterized by, and defines, a set of features comprised in the vehicle context vector, $S_i$, to be used in evaluating a message registered by CRW 40. Optionally, features comprised in the vehicle context vector are selected from Global Feature Vector 52. By way of example, as shown in data table 58, vehicle context vector $S_1$ includes four features selected from the Global Feature Vector: $f_{1,4}(L)$, $f_{5,7}(L)$, $f_{20,10}(L)$, and $f_{56,7}(L)$. By way of another example, vehicle context vector $S_2$ includes five features selected from the Global Feature Vector: $f_{15,3}(L)$, $f_{26,5}(L)$, $f_{26,10}(L)$, $f_{30,3}(L)$, and $f_{91,11}(L)$. By way of another example, vehicle context vector $S_4$ includes a single feature selected from the Global Feature Vector 52: $f_{45,6}(L)$. As such, by way of example, when processor 41 evaluates a message characterized by message $ID_i$, processor 41 provides the selected classifier $H(ID_i, S_i)$ with feature values stored in the appropriate vehicle context vector $S_i$ that is associated with the selected classifier.

FIG. 6B schematically illustrates a representation of Global Feature Vector 52, as shown in FIG. 5, and a representation of an exemplary vehicle context vector $S_1$, which indicated with reference numeral 55 and is also listed on data table 58 (FIG. 6A). When a feature comprised in Global Feature Vector 52 is updated with a new value, by way of example feature $f_{5,7}(L)$ that was updated responsive to the message registered by CRW 40 at $t_{400}$ as shown in and described with reference to FIG. 5, the feature $f_{5,7}(L)$ comprised in vehicle context vector $S_1$ is also updated. The updating of feature $f_{5,7}(L)$ comprised in vehicle context vector $S_1$ responsive to the updating of the corresponding feature in Global Feature Vector 52 is schematically represented in FIG. 6B as a block arrow 59.

In an alternative embodiment, the one or more vehicle context vectors $S_i$ are not stored as separate vectors, as indicated in FIGS. 6A and 6B, but rather as a constellation of features comprised within Global Feature Vector 52. As such, by way of example, when processor 41 evaluates a message characterized by message $ID_j$, processor 41 selects an appropirate set of features comprised in Global Feature Vector 52 as input to provide to classifier $H(ID_j, S_j)$ selected for evaluating the message, the appropriate set of features characterizing context feature vector $S_j$ that is associated with the selected classifier.

In an embodiment, CRW 40 is operable to keep a record of messaged it determines to be valid or invalid. The record of invalid messages may include one or more message attributes of the invalidated messages associated with a status of validity or invalidity, and optionally stored in memory 43. In an embodiment, all or a portion of the record of invalid messages, as well as other Watchman data gathered by CRW 40, optionally through its performance of processes 100 and/or 200, may be accessed by or transferred to a system, device, or module external to in-vehicle network 60, for example a Cyber-Hub, to analyze monitoring performance of CRW 40, by way of example to assess how frequently the Watchman generated false positives or false negatives in identifying messages as valid or invalid.

There is therefore provided in accordance with an embodiment of the disclosure a module for providing security to an in-vehicle communication network having a bus and at least one node connected to the bus, the module comprising: a memory having software comprising executable instructions and a model of an expected behavior of data communications over the portion of the in-vehicle communication network; and a processor that processes, responsive to the software in the memory, a plurality of messages registered from a portion of the in-vehicle network to: determine, based on the model and a context comprising attributes of the plurality of messages, whether or not at least one of the messages complies with the model; and if the at least one message does not comply with the model, then perform at least one action on the message. Optionally, the attributes of the plurality of messages comprise one or more attributes characterizing a behavior of an operator of the vehicle. Optionally, the model is defined by a classifier and the context is defined by a feature vector comprising one or more message attributes characterizing one or more messages other than the registered message.

In an embodiment, the memory comprises one or more classifiers and at least one feature vector comprising one or more message attributes characterizing one or more messages other than the registered message; and the processor processes, responsive to the software in the memory, the registered messages to: select a classifier from the plurality of classifiers, responsive to at least one attribute characterizing a registered message; determine the registered message as being valid or invalid, responsive to the selected classifier in light of the feature vector, and perform at least one action on the registered message responsive to the determination of the registered message being invalid. Optionally, each feature vector of the at least one feature vector is designated as an input to one of the one or more classifiers. Optionally, the at least one feature vector comprises one or more message attributes characterizing a location and/or movement of an operator of the vehicle or a portion of the operator, such that the validity of the registered message is determined responsive to the at least one message feature characterizing a location and/or movement of an operator of the vehicle or of at least one portion of the operator. Optionally, the one or more message attributes characterizing location and/or movement characterize a message generated by a driver action transducer or a gesture recognition system. Optionally, the gesture recognition system is an imaging system configured to monitor the operator during operation of the vehicle.

In an embodiment, the at least one attribute characterizing the registered message comprises a message ID of the registered message, and the selected classifier is selected responsive to a given message ID of the registered message. Optionally, the at least one attribute characterizing the registered message comprises one or both of: a change beyond a predefined threshold in a time-interval between the registered message and a most recent previous message having the same message ID as the given message ID; and a change beyond a predefined threshold in a value of a control signal between the registered message and a most recent previous message having the same message ID as the given message ID. Optionally, an output of the classifier comprises whether or not a message characterized by the given message ID is valid in light of the feature vector.

In an embodiment, the classifier is configured to provide an output of whether or not a change in a signal value is expected given the feature vector, and the message is considered valid if a change or lack thereof in the corresponding signal value in the registered message is consistent with the output of the classifier, and the message is considered invalid if a change or lack thereof in the corresponding signal value in the registered message is not consistent with the output of the classifier.

In an embodiment, the processor is operable to: update at least one message attribute comprised in the at least one feature vector to match a value of a corresponding attribute characterizing the registered message. Optionally, the processor is operable to update the at least one feature vector, responsive to the registered message being determined to be valid. Optionally, the processor is operable to: maintain another feature vector (a global feature vector), which at any given time comprises latest values of every message feature comprised in the at least one feature vector; update at least one message feature comprised in the global feature vector to match a value of a corresponding message feature characterizing the registered message; and update at least one message feature comprised in the at least one feature vector to match a value of a corresponding message feature comprised in the global feature vector.

In an embodiment, the at least one action on the message comprises disabling the registered message. Optionally, the processor is operable to disable the registered message further responsive to receiving instructions from an operator of the vehicle to increase security vigilance. Optionally, the processor is operable to instruct a human machine interface comprised in the vehicle to alert the operator to the presence of a message conflict, responsive to the registered message being determined to not comply with the model, and prompt the operator to provide instructions to increase security vigilance.

In an embodiment, the module is a hardware module comprising a network interface configured to be connected to the portion of an in-vehicle communication network of the vehicle. In an embodiment, the module is a software module that is integrated with software of the at least one node of the in-vehicle network.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A module for processing a given message registered by an in-vehicle communication network having a bus and at least one node connected to the bus to provide security to the in-vehicle communication network, the module comprising:
 a memory storing:
  software comprising executable instructions;
  a vehicle context defined by at least one feature vector comprising attributes of a plurality of messages, other than the given registered message, registered from at least a portion of the in-vehicle communication network; and
  a model of an expected behavior of data communications over the in-vehicle communication network defined by a plurality of classifiers, wherein each feature vector of the at least one feature vector is designated as an input to one of the plurality of classifiers; and
 a processor that processes, the given registered message responsive to the software in the memory, to:
  select a classifier from the plurality of classifiers, responsive to at least one attribute characterizing the given registered message;
  determine the given registered message as being valid or invalid, responsive to the selected classifier in light of the at least one feature vector; and
  perform at least one action on the given registered message responsive to the determination of the given registered message being invalid.

2. The module according to claim 1, wherein the attributes of the plurality of messages comprise one or more attributes characterizing a behavior of an operator of the vehicle.

3. The module according to claim 1, wherein the at least one feature vector comprises one or more message attributes characterizing a location and/or movement of an operator of the vehicle or a portion of the operator, such that the validity of the given registered message is determined responsive to the at least one message feature characterizing a location and/or movement of an operator of the vehicle or of at least one portion of the operator.

4. The module according to claim 3, wherein the one or more message attributes characterizing location and/or movement characterize a message generated by a driver action transducer or a gesture recognition system.

5. The module according to claim 4, wherein the gesture recognition system is an imaging system configured to monitor the operator during operation of the vehicle.

6. The module according to claim 1, wherein the at least one attribute characterizing the given registered message comprises a message ID of the given registered message, and the selected classifier is selected responsive to a given message ID of the given registered message.

7. The module according to claim 6, wherein the at least one attribute characterizing the given registered message comprises one or both of:
 a change beyond a predefined threshold in a time-interval between the given registered message and a most recent previous message having the same message ID as the given message ID; and
 a change beyond a predefined threshold in a value of a control signal between the given registered message and a most recent previous message having the same message ID as the given message ID.

8. The module according to claim 6, wherein an output of the classifier comprises whether or not a message characterized by the given message ID is valid in light of the feature vector.

9. The module according to claim 1, wherein the classifier is configured to provide an output of whether or not a change in a signal value comprised in a message is expected given the feature vector, and
 the message is considered valid if a change or lack thereof in the corresponding signal value comprised in the given registered message is consistent with the output of the classifier; and
 the message is considered invalid if a change or lack thereof in the corresponding signal value comprised in the given registered message is not consistent with the output of the classifier.

10. The module according to claim 1, wherein the processor is operable to:
 update at least one message attribute comprised in the at least one feature vector to match a value of a corresponding attribute characterizing the given registered message.

11. The module according to claim 10, wherein the processor is operable to update the at least one feature vector, responsive to the given registered message being determined to be valid.

12. The module according to claim 11, wherein the processor is operable to:
 maintain a global feature vector, which at any given time comprises latest values of every message feature comprised in the at least one feature vector;
 update at least one message feature comprised in the global feature vector to match a value of a corresponding message feature characterizing the given registered message; and
 update at least one message feature comprised in the at least one feature vector to match a value of a corresponding message feature comprised in the global feature vector.

13. The module according to claim 1, wherein the module is a hardware module comprising a network interface configured to be connected to the portion of an in-vehicle communication network of the vehicle.

14. The module according to claim 1, wherein the module is a software module that is integrated with software of the at least one node of the in-vehicle communication network.

15. A module for providing security to an in-vehicle communication network having a bus and at least one node connected to the bus, the module comprising:
 a memory storing:
  software comprising executable instructions;
  a vehicle context comprising attributes of a plurality of messages registered from at least a portion of the in-vehicle communication network; and
  a model of an expected behavior of data communications over the in-vehicle communication network; and
 a processor that processes, responsive to the software in the memory, a message registered from the in-vehicle communication network to:

determine, based on the model and the vehicle context, whether or not the registered message complies with the model; and if the registered message does not comply with the model, then perform at least one action on the registered message wherein the at least one action on the message comprises disabling the-registered message.

16. The module according to claim 15, wherein the processor is operable to disable the registered message further responsive to receiving instructions from an operator of the vehicle to increase security vigilance.

17. The module according to claim 16, wherein the processor is operable to instruct a human machine interface comprised in the vehicle to alert the operator to the presence of a message conflict, responsive to the registered message being determined to not comply with the model, and prompt the operator to provide instructions to increase security vigilance.

* * * * *